United States Patent [19]

Mesnel

[11] Patent Number: 4,535,563
[45] Date of Patent: Aug. 20, 1985

[54] WINDOW SEAL

[75] Inventor: Francois Mesnel, Neuilly-sur-Seine, France

[73] Assignee: Etablissements Mesnel, Carrieres-sur-Seine, France

[21] Appl. No.: 550,041

[22] Filed: Nov. 8, 1983

[30] Foreign Application Priority Data

Nov. 8, 1982 [FR] France .............................. 82 18659

[51] Int. Cl.$^3$ .............................................. E06B 7/16
[52] U.S. Cl. ........................................ 49/478; 49/374
[58] Field of Search ................ 49/478, 502, 374, 375, 49/227, 485

[56] References Cited

U.S. PATENT DOCUMENTS 4,490,942  1/1985  Arnheim et al. ...................... 49/374

FOREIGN PATENT DOCUMENTS 2718448  11/1978  Fed. Rep. of Germany ........ 49/478

Primary Examiner—Kenneth Downey
Attorney, Agent, or Firm—Schwartz, Jeffery, Schwaab, Mack, Blumenthal & Evans

[57] ABSTRACT

The seal comprises a first portion mounted to at least a part of the inner peripheral edge of the window opening. The first portion includes a flexible body, a first magnetic element received in the flexible body, and a flexible sealing member. A second portion is mounted to at least a part of the outer peripheral edge of the window in a position to face the first portion and to contact the flexible sealing member when the window is closed. The second portion includes a casing member, and a second magnetic element received in the casing member. Flocking is connected to at least one of the first and second portions. The flocking is positioned between the contacting area of said first and second portions when said window is closed. The flocking reduces friction between the first and second portions to facilitate sliding of the window. At least one of the first and second magnetic elements is a permanent magnet.

10 Claims, 7 Drawing Figures

U.S. Patent   Aug. 20, 1985   4,535,563
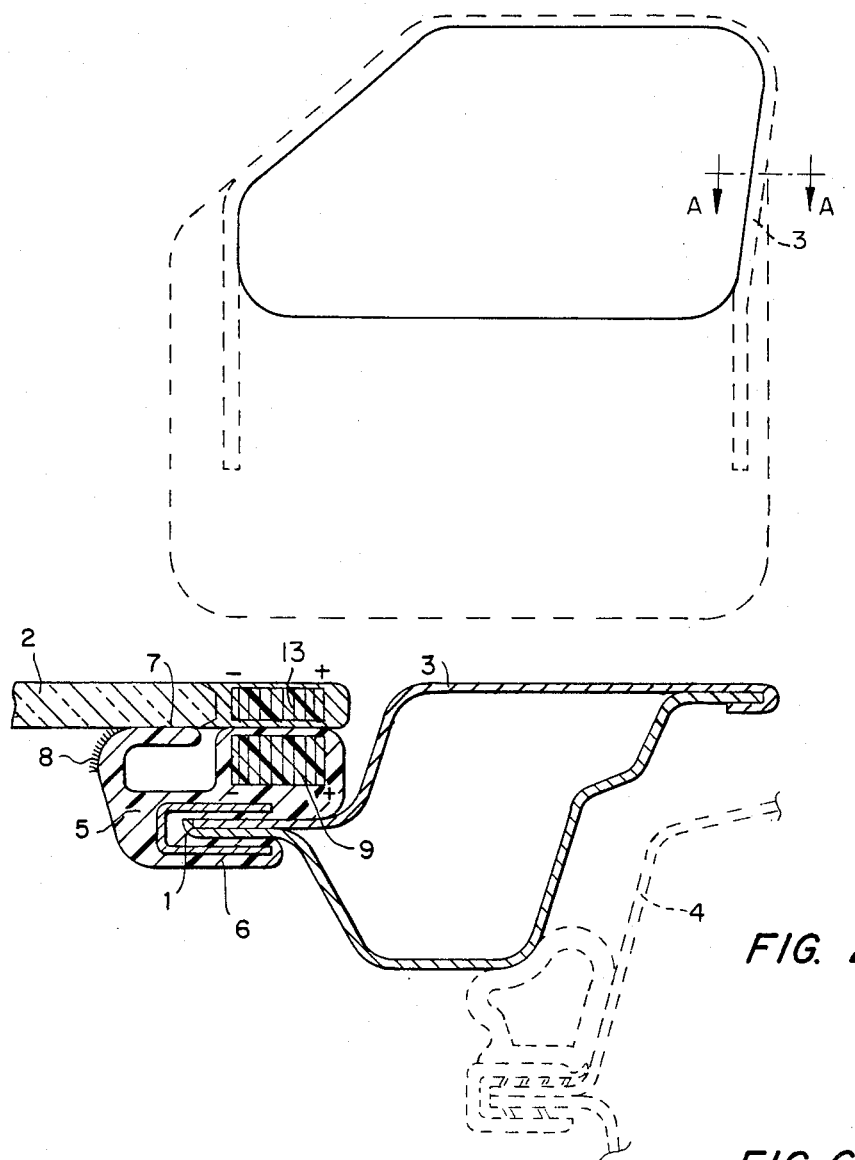
FIG. 1.
FIG. 2.
FIG. 3.
FIG. 4.
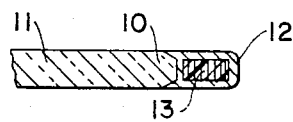
FIG. 5.
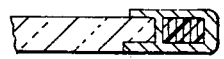
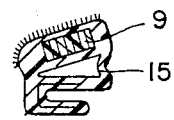
FIG. 6.
FIG. 7.

WINDOW SEAL

BACKGROUND OF THE INVENTION

The present invention relates to seals for windows of automotive vehicles, and especially to such seals which are designed for use in vehicles having windows which are mounted flush with the vehicle body.

Wind tunnel research has demonstrated that the coefficient of drag (Cd) of an automobile is affected by the configuration of the vehicle body and in particular by the manner in which body components are attached. This type of research has demonstrated the importance of maintaining the windows of a vehicle flush with the vehicle body. However, conventional seals have been found to be poor for use in maintaining windows of an automobile flush, and at the same time maintaining an adequate seal around the windows.

SUMMARY OF THE INVENTION

One object of the present invention is to provide a window seal which can be used in a flush mounted automobile window.

A further object of the present invention is to provide a window seal which presents no protruding structure to increase the Cd of a vehicle on which it is used.

Another object of the present invention is to provide a window seal which assists in compensating for misalignment of a window to thereby provide a maximum sealing effect.

In accordance with the above and other objects, the present invention comprises a seal for a movable window, the window being mounted in a supporting structure having a window opening and being capable of movement between a closed position in which the window covers the window opening, and an open position in which the window uncovers the window opening. The supporting structure has an outer surface, and the window has an outer surface substantially flush with the supporting structure outer surface when the window is in the closed position. The opening has an inner peripheral edge and the window has an outer peripheral edge. The seal comprises a first portion mounted to at least a part of the inner peripheral edge. The first portion comprises a flexible body, a first magnetic element received in the flexible body, and a flexible sealing member. A second portion is mounted to at least a part of the outer peripheral edge in a position to face the first portion and to contact the flexible sealing member when the window is in the closed position. The second portion comprises a casing member, and a second magnetic element is received in the casing member. Flocking is connected to at least one of the first and second portions, the flocking being positioned between the contact area of the first and second portions when the window is in the closed position for reducing friction between the first and second portions to facilitate sliding of the window in the window opening. At least one of the first and second magnetic elements is a permanent magnet.

In accordance with other aspects of the invention, the magnetic elements are both permanent magnets, and the magnet elements are positioned such that their magnetic fluxes are oppositely oriented when the window is in the closed position.

In accordance with another aspect of the invention, the other of the magnetic elements is a ferrous metal.

Also, in accordance with the invention, the flexible body may include a U-shaped clamping portion receiving a U-shaped metal clamp for clamping to the inner peripheral edge.

The casing may be a non-ferrous metal, or a paramagnetic material.

In accordance with further aspects of the invention, the supporting structure comprises an automotive vehicle body, and the first magnetic element comprises a portion of the vehicle body. The inner peripheral edge is spaced slightly from the outer peripheral edge, and the second portion is sufficiently thick to extend between the inner and outer peripheral edges.

In one embodiment of the invention, the first portion comprises a mounting section, the flexible sealing member being integral with the mounting section, and the flexible body being integral with the mounting section but spaced from the flexible sealing member.

In accordance with another embodiment, the first portion comprises a mounting section, and the flexible body is hingedly mounted to the mounting section to form the flexible sealing member.

BRIEF DESCRIPTION OF THE DRAWINGS

The above and other objects of the present invention will become more readily apparent as the invention is more fully set forth in the detailed description to follow, in which like reference numerals represent like parts throughout, and wherein:

FIG. 1 is an elevational schematic view of a portion of an automobile, indicating by solid lines the outline of an upper opening for a movable window;

FIG. 2 is an enlarged, transverse sectional view taken on the line A—A of FIG. 1 showing the uppen frame of the door with the movable window installed with improvements according to the present invention;

FIG. 3 is a transverse sectional view showing the lateral rim of the movable window with improvements according to the present invention;

FIG. 4 is another embodiment of a lateral rim of the movable window with improvements according to the present invention;

FIG. 5 is a transverse sectional view of a partial framing profile of an opening for the movable window of FIG. 2, prior to installation;

FIG. 6 is a transverse sectional view of another embodiment of a partial framing profile of the opening for the movable window, prior to installation, and FIG. 7 is a transverse sectional view of the frame profile of FIG. 6, but after installation and with the mobile window assumed to be in place.

DETAILED DESCRIPTION OF THE PREFERRED EMBODIMENTS

As shown in FIGS. 1 and 2, a door 3 is articulated to an automobile frame 4, as indicated by dotted lines. The door 3 contains an internal opening 1 for a movable window. Two lateral rims of the internal opening are equipped in an inversely symmetrical manner with a so-called "flanged" joint 5. Joint 5 is advantageously made of a natural or synthetic elastomer, and is novel in that it combines a so-called clamping profile with a conventional metallic center core 6 in the shape of a U with a sealing lip 7 which contains flocking 8, and a portion having an opening with a rectangular cross-section to permit the installation therein of a magnetic element in the form of a bead core 9. Bead core 9 comprises a permanent magnet of, for example, a "magnetic elastomer" of the type that has been used for a long time for the sealing joints of refrigerator doors.

Also, on the periphery, or at least on the two lateral rims 10, of the movable window 2 in FIG. 2 and 11 in FIG. 3, there are placed nonmagnetic or paramagnetic tubular members 12. Tubular members 12 are preferably mounted by using an acrylic adhesive which may advantageously be activated by ultraviolet radiation. These members 12 are preferably made of aluminum, and contain openings which are rectangular in cross section to permit the installation of a magnetic element 13 of the aforedescribed type. Magnetic elements 13 are inserted in the rectangular openings such that their magnetic flux is oriented in the inverse direction to that of magnetic elements 9. In this manner, magnetic elements 13 are attracted to magnetic elements 9, by a well-known magnetic effect.

It will be readily understood that using the foregoing construction, any inadequacy occurring in the guidance of the window upper portion is compensated for by the magnetic attraction of opposing magnetic fluxes which act across the low width the "gap" formed between the opposing magnets 9 and 13. Also, in this configuration, the "flocking" on sealing lip 7 and on the portion containing magnetic element 9 assures that the window slides easily, and the nonmagnetic or paramagnetic tubing assures that the window will not stick due to an interfering "remanence" effect.

Even further, the construction of the present invention permits the outer surface of the window to be flush with the outer vehicle walls thereby ensuring unobstructed gliding of atmospheric air along the vehicle and reducing the coefficient of drag of the vehicle.

It should be understood that the embodiment shown in FIG. 4, differs only by the use of a slightly differently shaped tubular member. In FIG. 4, the tubular member is U-shaped, whereas in FIG. 3, tubular member 12 contains a camfered surface for connection to the window 11; otherwise, the tubular members are the same.

The embodiment of the flanged joint shown in Figures 6 and 7 is similar to flanged joint 5 except that sealing lip 7 has been replaced by an elastic connection 15 between the portion surrounding magnetic element 9 and the clamping portion. Elastic connection 15 causes the portion surrounding magnetic element 9 to flex outwardly and permits this portion to be forced inward by the window 11 to form a proper seal.

Other changes to the invention are also possible. For example, the range of the invention includes the substitution of a "ferrous" element for one of the two beads which form the permanent magnets. The ferrous element may be of the same cross section as the beads and may be solid or of "iron powder", agglomerated for example by means of a "plastic binder". This construction provides high magnetic permeability and is economical, at least in conventional cases for vehicle doors made of iron or mild steel sheet material, and yet performs in all cases the role of a so-called "magnetic armature".

The foregoing description has been set forth for the purpose of illustrating the present invention, but is not deemed to limit the invention in any way. Clearly, numerous additional additions, substitutions and other modifications could be made to the invention without departing from the scope of the invention, as set forth in the appended claims.

What is claimed is:

1. A seal for a movable window, said window being mounted in a supporting structure having a window opening and being capable of movement between a closed position in which said window covers said window opening, and an open position in which said window uncovers said window opening, said supporting structure having an outer surface, and said window having an outer surface substantially flush with said supporting structure outer surface when said window is in said closed position, said opening having an inner peripheral edge and said window having an outer peripheral edge, said seal comprising:

a first portion mounted to at least a part of said inner peripheral edge, said first portion comprising: a flexible body, a first magnetic element received in said flexible body, and a flexible sealing member;

a second portion mounted to at least a part of said outer peripheral edge in a position to face said first portion and to contact said flexible sealing member when said window is in said closed position, said second portion comprising: a casing member, and a second magnetic element received in said casing member; and flocking connected to at least one of said first and second portions, said flocking being positioned between said contacting area of said first and second portions when said window is in said closed position for reducing friction between said first and second portions to facilitate sliding of said window in said window opening;

wherein at least one of said first and second magnetic elements is a permanent magnet.

2. A seal as set forth in claim 1 wherein both of said magnetic elements are permanent magnets, and said magnet elements are positioned such that their magnetic fluxes are oppositely oriented when said window is in the closed position.

3. A seal as set forth in claim 1 wherein the other of said magnetic elements is ferrous.

4. A seal as set forth in claim 1 wherein said flexible body includes a U-shaped clamping portion receiving a U-shaped metal clamp for clamping to said inner peripheral edge.

5. A seal as set forth in claim 1 wherein said casing is a non-ferrous metal.

6. A seal as set forth in claim 1 wherein said casing is a paramagnetic material.

7. A seal as set forth in claim 1 wherein said wherein said supporting structure comprises an automotive vehicle body, and said first magnetic element comprises a portion of said vehicle body.

8. A seal as set forth in claim 7 wherein said inner peripheral edge is spaced slightly from said outer peripheral edge, and said second portion is sufficiently thick to extend between said inner and outer peripheral edges.

9. A seal as set forth in claim 1 wherein first portion comprises a mounting section, said flexible sealing member being integral with said mounting section, and said flexible body being integral with said mounting section but spaced from said flexible sealing member.

10. A seal as set forth in claim 1 wherein said first portion comprises a mounting section, and said flexible body is hingedly mounted to said mounting section to form said flexible sealing member.

* * * * *